(12) United States Patent
Weinberg et al.

(10) Patent No.: US 8,175,728 B2
(45) Date of Patent: May 8, 2012

(54) DETECTING USER GESTURES WITH A PERSONAL MOBILE COMMUNICATION DEVICE

(75) Inventors: Gil Weinberg, Atlanta, GA (US); Jagadeeswaran Jayaprakash, Puducherry (IN)

(73) Assignee: Georgia Tech Research Corporation, Atlanta, GA (US)

( * ) Notice: Subject to any disclaimer, the term of this patent is extended or adjusted under 35 U.S.C. 154(b) by 958 days.

(21) Appl. No.: 12/178,496

(22) Filed: Jul. 23, 2008

(65) Prior Publication Data

US 2009/0157206 A1    Jun. 18, 2009

Related U.S. Application Data

(60) Provisional application No. 61/013,360, filed on Dec. 13, 2007, provisional application No. 61/021,181, filed on Jan. 15, 2008, provisional application No. 61/036,298, filed on Mar. 13, 2008, provisional application No. 61/036,300, filed on Mar. 13, 2008.

(51) Int. Cl.
*G06F 17/00* (2006.01)

(52) U.S. Cl. .......................................... 700/94; 345/177
(58) Field of Classification Search .................... 345/177
See application file for complete search history.

(56) References Cited

U.S. PATENT DOCUMENTS

| | | | |
|---|---|---|---|
| 7,336,266 B2 | 2/2008 | Hayward et al. | |
| 2001/0006006 A1* | 7/2001 | Hill | 73/606 |
| 2003/0217873 A1* | 11/2003 | Paradiso et al. | 178/18.04 |
| 2004/0267540 A1* | 12/2004 | Boillot et al. | 704/278 |
| 2007/0137462 A1 | 6/2007 | Barros et al. | |
| 2008/0211766 A1 | 9/2008 | Westerman et al. | |
| 2009/0027338 A1 | 1/2009 | Weinberg et al. | |

OTHER PUBLICATIONS

Pirhonen, et al.; Gestural and Audio Metaphors as a Means of Control for Mobile Devices; CHI 2002, Minneapolis, Minnesota, USA, vol. 4, Issue No. 1; Copyright 2002; pp. 291-298.

* cited by examiner

*Primary Examiner* — Walter F Briney, III
(74) *Attorney, Agent, or Firm* — Thomas, Kayden, Horstemeyer & Risley, LLP

(57) ABSTRACT

System and methods for recognizing user gestures by processing audio from a microphone in a personal mobile communication device (PMCD) are disclosed. One such method includes sensing audio using a microphone in the PMCD and detecting a user gesture from audio sensed by the microphone. One such system includes a microphone, memory for storing instructions, and a processor configured by the instructions to sense audio using the microphone and detecting user gestures from audio sensed by the microphone. Also disclosed is a computer-readable medium storing a computer program for use in a personal mobile communication device. The program comprises instructions to: sense audio using a microphone in the personal mobile communication device; record the audio sensed by the microphone; process the recorded audio to extract a feature; classify the feature of the recorded audio; and identify one of a plurality of user gesture types based on the classified feature.

2 Claims, 14 Drawing Sheets

K-NEAREST NEIGHBOR
=== CONFUSION MATRIX ===
A    B      CLASIFICATION
81   26    | A = 1 (tap NEAR the mic)
3    90    | B = 2 (tap FAR FROM the mic)

CORRECTLY CLASSIFIED INSTANCES     171   85.5%
INCORRECTLY CLASSIFIED INSTANCES   29   14.5%

FIG. 12

DETECTING USER GESTURES WITH A PERSONAL MOBILE COMMUNICATION DEVICE

CROSS REFERENCE TO RELATED APPLICATIONS

This application claims the benefit of U.S. Provisional Application No. 61/013,360 filed Dec. 13, 2007, U.S. Provisional Application No. 61/021,181, filed Jan. 15, 2008 and U.S. Provisional Application No. 61/036,298, filed Mar. 13, 2008, and U.S. Provisional Application No. 61/036,300, filed Mar. 13, 2008.

U.S. Provisional Application No. 60/951,558 is incorporated in its entirety herein by reference, U.S. Provisional Application No. 61/013,360 is incorporated in its entirety herein by reference, U.S. Provisional Application No. 61/036,298 is incorporated in its entirety herein by reference. Those sections of U.S. Provisional Application No. 61/021,181 and U.S. Provisional Application No. 61/036,300 labeled "BlueMic" are incorporated herein by reference. U.S. patent application entitled: Gestural Generation, Sequencing and Recording of Music on Mobile Devices, with inventors Gil Weinberg, Benedikt Loesch and Andrew Beck, filed on Jul. 23, 2008 is incorporated in its entirety herein by reference.

TECHNICAL FIELD

The present disclosure is generally related to interfaces for computing devices, and more particularly, is related to user gesture detection and recognition for human-machine interaction.

BACKGROUND

Within the last two decades, cellular phones have become incorporated into almost every aspect of daily life. Cellular phones are truly ubiquitous devices which have achieved their usefulness and relatively low cost from continuing advances in modern microelectronics. As microelectronic memory densities and processing power have increased year after year, cellular phones have benefited from the commensurate availability of increasing computing power. Coupled with advances in radio frequency (RF) integrated circuits, power management microelectronics, and battery charge density improvements, the size of a typical cellular phone has been reduced to a package which fits easily in the palm of a hand.

The computational power now available in modern 3G (third generation) cellular phones rivals that of wireless personal digital assistants, so much so that there is presently almost no distinction between cellular phones, wireless communication devices targeted for email (e.g., BlackBerry™), and wireless personal digital assistants (wPDAs) (e.g. Treo™, PalmPilot™, etc.). Any device which provides bidirectional audio communication over a cellular radio network and possesses sufficient local processing capability to control the device and execute stored user applications (e.g., text messaging, email, calculator, web browser, games) is often referred to as a "smart phone." The term "personal mobile communication devices" (PMCDs) more broadly comprises a class of devices which includes, but is not limited to, "smart phones," wireless PDAs, and cellular phones, as well as other devices for communicating or processing speech which possess various degrees and combinations of embedded processing power and network connectivity (e.g., Apple™ iPhone™).

One problem suffered by conventional PMCDs is that they have inherited many features of their present user interface designs directly from the traditional computer and cellular phone industries. Today's PMCD user interface may include a graphical user interface (GUI) displayed to the user on an embedded liquid crystal display (LCD) or thin-film transistor (TFT) graphical display device, a cursor control feature, possibly one or more function buttons, and a keypad or full keyboard, as well as a microphone and a speaker. The continually shrinking package size of these devices, however, leads to several user interface problems. For instance, in order to accommodate a full keyboard, each of the keys are made extremely small so that the entire keyboard may be fitted onto the device even when a fold-out or slide-out keyboard design is used. The reduced key size can present frustrating challenges to users whose fingers may be too large to type comfortably. Further, within a typical GUI-based environment, some user actions can only be carried out by traversing multiple levels of menus of the graphical user interface. Often the cursor controller present on the device is insufficient or clumsy for navigating a GUI. Many PMCDs suffer from these problems.

Thus, there exists a need and opportunity for improvements in human-machine interface techniques and technologies which can offer much more natural interactions between the user and the PMCD in which the user is not constrained to interact with a PMCD solely through manipulation of buttons, keys, cursors, or other GUIs.

To improve and add additional functionality to the user interface, a PMCD may include one or more types of transducers. One example of a transducer included in several higher-end PMCDs is the accelerometer. The usefulness of an accelerometer arises from its ability to sense minute accelerations of the PMCD resulting from changes in kinetic forces as well as gravitational forces acting upon the device. For instance, an accelerometer may be used to detect user gestures such as strikes of the PMCD against an external body, or, conversely, the strike of an external body against the PMCD. Such a gestural event, if caused by the user, may be described as a "tap" or a "hit" of the device. This "tap" signal can be captured, recognized, and mapped to a specific user interface function to perform a useful action. An accelerometer may also be used to detect if the device has been dropped or if the device's orientation with respect to gravity has changed (e.g., if the device has been tilted) or even to detect if the device has been picked up in preparation for answering a call.

A large drawback to including accelerometers in PMCDs, however, is cost. Accelerometers are not typically included in PMCDs targeted at lower-cost device markets, thus their functionality, correspondingly, is not available on many devices. Further, many PMCD already in use do not contain accelerometers, so there is no means by which to provide these devices with such functionality.

Another example of a transducer which is included in PMCDs is the microphone. Although not responsive to acceleration of the PMCD like the accelerometer, the microphone is responsive to speech, music, and other sound waves and operates to convert speech and other sounds into electrical signals. Compared with an accelerometer, a microphone is a relatively inexpensive device which can be used as an inexpensive substitute to provide a gesture sensing capability similar to that of the accelerometer.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 12 is a confusion matrix comprising the number of gestures classified into two type categories illustrating the classification successes and failures and a listing of the overall absolute number of and relative percentages of correctly and incorrectly identified gestures.

DETAILED DESCRIPTION

Figure 1C:
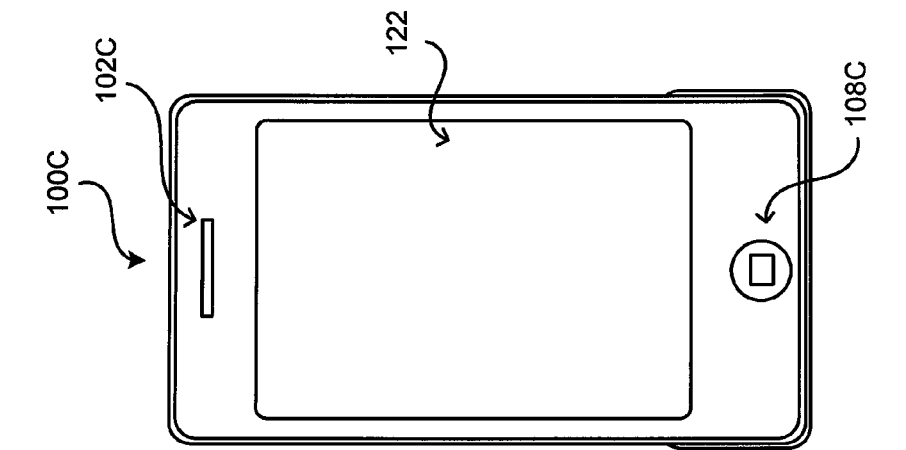
FIG. 1C is a representative diagram of an Apple™ iPhone™ mobile communication device, according to one embodiment of the methods and methods disclosed herein.

Various embodiments of a method and method for detecting user gestures with a microphone in a personal mobile communication device (PMCD) are disclosed. User gestures include those motions a user makes with and upon the PMCD thereby creating characteristic sounds which can be sensed by the microphone. Such user gestures include "taps" of a finger or other object upon the body of the PMCD proximate to the microphone, similar taps upon the body of the PMCD distal to the microphone, taps upon the surfaces of the PMCD, sweeps of the PMCD with the arm, rotations of the PMCD in free space, and strikes upon other objects with the PMCD. Methods and methods for detecting user gestures using a microphone in a PMCD will be described in the context of a PMCD embodied in a cellular phone, however, it will be understood that the principles of operation can be applied to other devices which include a microphone coupled to a processing method. Further, it will be understood that the scope of the embodiments extends to other types of communication, processing, and such similar devices known or developed in the future.

Various embodiments of the methods and methods described herein allow repeated or multiple-step GUI operations to be replaced by a single step which does not involve key presses, cursor movement, or utilization of a graphical user interface, but, rather, one in which distinct user gestural events, such as shakes of the PMCD or taps upon or with the PMCD, are captured and recognized by the PMCD as inputs to command the performance of particular actions or sequences of actions. Further, embodiments of gestural interfaces disclosed herein opens new avenues for development of applications not traditionally associated with PMCDs, for instance music creation applications in which user gestural events become basic inputs to the application and recognized user gestures may be mapped to events such as striking a virtual drumhead.

Various embodiments of the methods and methods for identifying user gestures disclosed herein allow personal mobile communication device to be trained to recognize and discriminate between multiple user gestures comprised of various taps upon the PMCD's body near the embedded microphone, taps on its body far from the embedded microphone, and taps on the side opposite the embedded microphone. The PMCD may also be trained to discriminate between taps made upon the PMCD with objects comprised of different material (e.g., a metal, wood, etc.), as well as to differentiate strikes of the PMCD upon objects or surfaces composed of different materials (e.g., a metal surface, a wood surface, etc).

Identifying user gestures from audio recorded with a microphone is a difficult problem, the solution to which may involve training a device to recognize one or more identifying characteristics obtained from a signal containing a particular gesture. Specific signal characteristics recovered from multiple recordings of a particular user gesture may differ in absolute values while possessing a similar overall general character. Therefore, in order to correctly classify a particular user gesture with confidence, it is useful to employ a method which can learn to recognize the general distinguishing characteristics of each gesture of interest. To be more useful, such a method should also discriminate against background noise or other perturbations occurring in the signal which may obscure or mask the underlying user gesture.

Figure 1B:
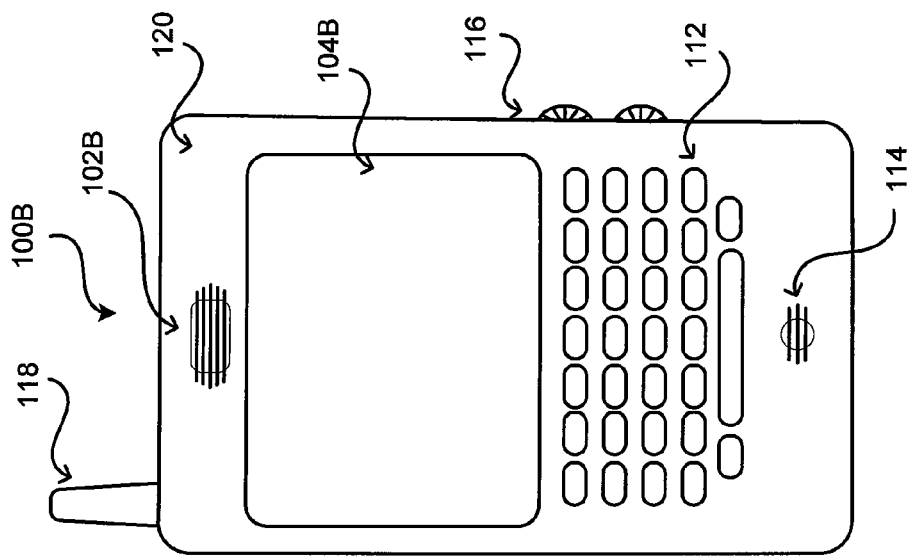
FIG. 1B is a representative diagram of a wireless personal digital assistant, according to one embodiment of the methods and methods disclosed herein.
Figure 1A:
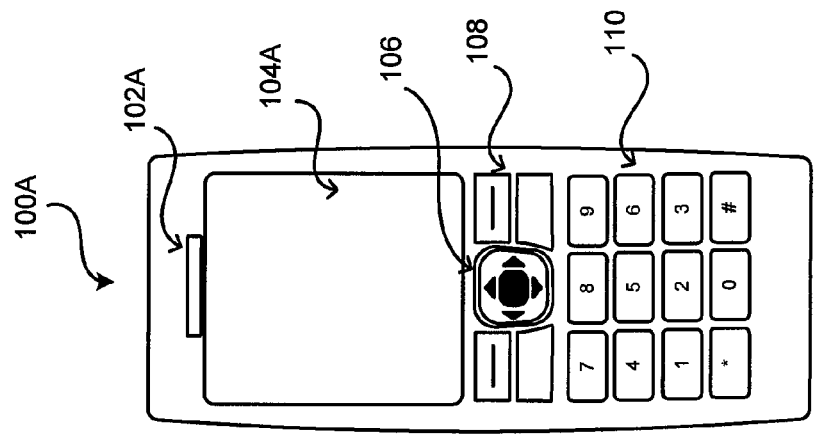
FIG. 1A is a representative diagram of a cellular phone mobile communication device, according to one embodiment of the methods and methods disclosed herein.

FIGS. 1A-1C illustrate three representative examples of personal mobile communication devices (PMCDs) which can be used to implement various embodiments of the methods and methods for identifying user gestures disclosed herein. FIG. 1A is an illustration of a mobile cellular phone, 100A; FIG. 1B is an illustration of a wireless personal digital assistant, 100B; and FIG. 1C is an illustration of an Apple™ iPhone™, 100C. Each device is housed in a handheld case, and includes a graphical display for communicating text and/or graphics and one or more data entry devices, (e.g., keypad 110, keyboard 112, and touchpad 120). Each of these figures illustrates a general representation of a device. These illustrations, however, are not intended to limit the applicability of the present disclosure to only these devices; embodiments of the disclosed methods and methods may incorporate other devices.

Each device illustrated in FIGS. 1A-1C includes an audio transducer for converting sound pressure waves into electrical signals and a speaker for the reverse conversion. An example of an audio transducer which converts sound waves falling within the frequency band of human speech is the microphone. In particular, FIG. 1B illustrates a microphone in direct communication with the external environment through an aperture, 114, formed in a case 120. FIG. 1A and FIG. 1C illustrate devices which enclose a microphone entirely within each PMCD body, without an aperture to connect the microphone to either external environment.

Each device illustrated in FIGS. 1A-1C, is also capable of two-way voice communication via a radio connection with at least one wireless network. Device 100B illustrates one embodiment in which an external antenna 118 is present for wireless transmission and reception capability. In another embodiment, a method does not include an external antenna, but includes instead an internal antenna for wireless connectivity with external networks. Examples of the latter methods are illustrated by devices 100A and 100C.

Figure 2B:
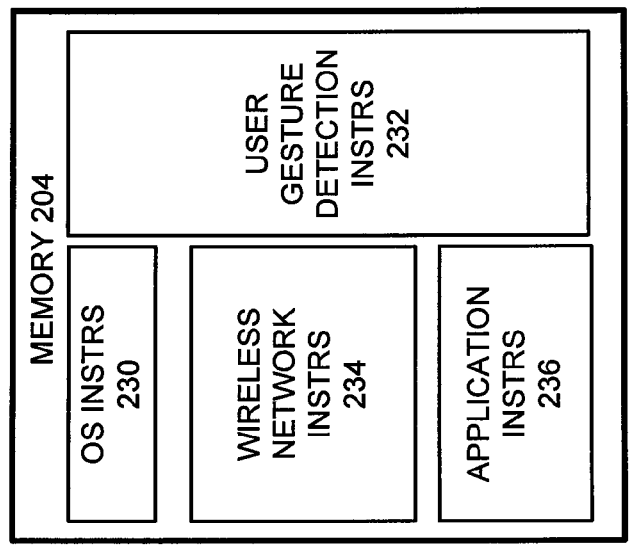
FIG. 2B is a block diagram of the memory included in the personal mobile communication device (PMCD) of FIG. 1, according to one embodiment of the methods and methods disclosed herein.
Figure 2A:
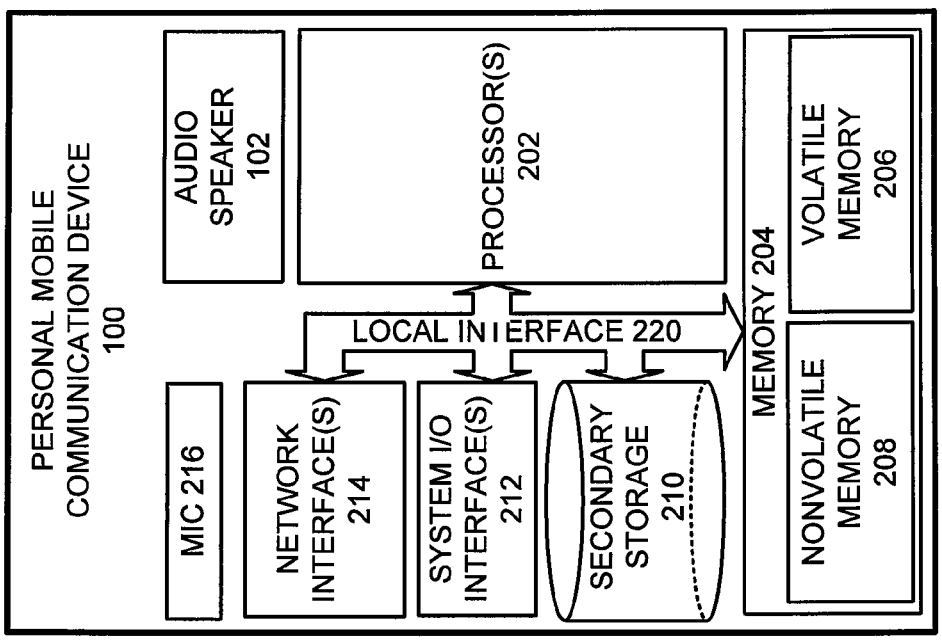
FIG. 2A is a block diagram of a personal mobile communication device (PMCD), according to one embodiment of the methods and methods disclosed herein.

FIGS. 2A-2B illustrate a block diagram of one architecture for an embedded computing and communication method of which PMCDs 100A, 100B, and 100C are examples. FIG. 2A illustrates a block diagram of the architecture in which PMCD 100 is comprised of several blocks including processor 202, memory sub-method 204 comprised of volatile memory 206 and nonvolatile memory 208, secondary storage 210, method input/output interface(s) 212, network interface(s) 214, microphone 216, and audio speaker 102.

Method input/output block 212 includes interfaces to sensors which allow users to interact with the device. Interfaces which may be present include interfaces for: a graphical display, a keypad, a keyboard, navigation, and function keys including softkeys, a touchscreen, one or more thumbwheels, accelerometer(s), and a camera. Network interface 214 includes at least one wireless communication transceiver module which communicates with a wireless network such as a cellular radio network, a local area network (IEEE 802.11 Wi-Fi™, WiMax™, etc.) or a personal area network (e.g., Bluetooth™).

Processor 202 may be one or a combination of several types of electronic processing devices including, but not limited to, a central processing unit, a microprocessor, and a microcontroller. PMCD 100 may include a digital signal processor (DSP) as a component of, or in addition to, processor 202. The specialized computational power available in a DSP can allow PMCD 100 to efficiently utilize a multitude of different sensors including those whose outputs can be sampled and digitized, whose outputs are natively digital, or those whose output may require specialized signal processing (e.g., an embedded camera).

FIG. 2B illustrates in further detail memory submethod 204 which includes instructions that are executable on processor 202. Memory submethod 204 includes instructions for an operating method 230, instructions for user gesture detection 232, instructions for wireless network communication, and instructions for other applications 234.

In each embodiment, PMCD 100 includes instructions configured to detect user gestures from signals received from microphone 216. The detected gestures can then be used to control operation of PMCD 100 or the operation of a remote external host (described later in connection with FIG. 8), or used as input to applications executing on either PMCD 100 (e.g., applications 234) or on the remote external host. PMCD 100 may be in communication with the remote external host via a wired link, via a cellular radio network, or through one of several well-known open-standard wireless RF communication protocols implemented by both PMCD 100 and the remote external host (e.g. Bluetooth™, Wi-Fi™, etc.).

In one embodiment, microphone 216 generates an analog signal, and PMCD 100 digitizes this analog signal into a discrete-time series of quantified values. Standard digital signal sampling techniques may be utilized to digitize the output of microphone 216. Unless otherwise noted, future references to the output of microphone 216 will be considered to be to a series of discrete-time quantized samples representative of the original signal and from which the original signal may be reconstructed.

Sound signals may be transmitted from PMCD 100 to a cellular radio network for delivery to a second PMCD, and signals may be received by PMCD 100 from the cellular radio network as in traditional cellular voice communications. The signals, or, equivalently, their digitally sampled discrete-time representation, may be further processed digitally following reception by a remote device in order to transform, analyze, or reconstruct the original signal. In one embodiment, the device responsible for processing the audio may be contained within PMCD 100 itself. In another embodiment, it may reside within a remote external host. In other embodiments, the device may be partitioned between PMCD 100 and the remote external host.

Figure 3:
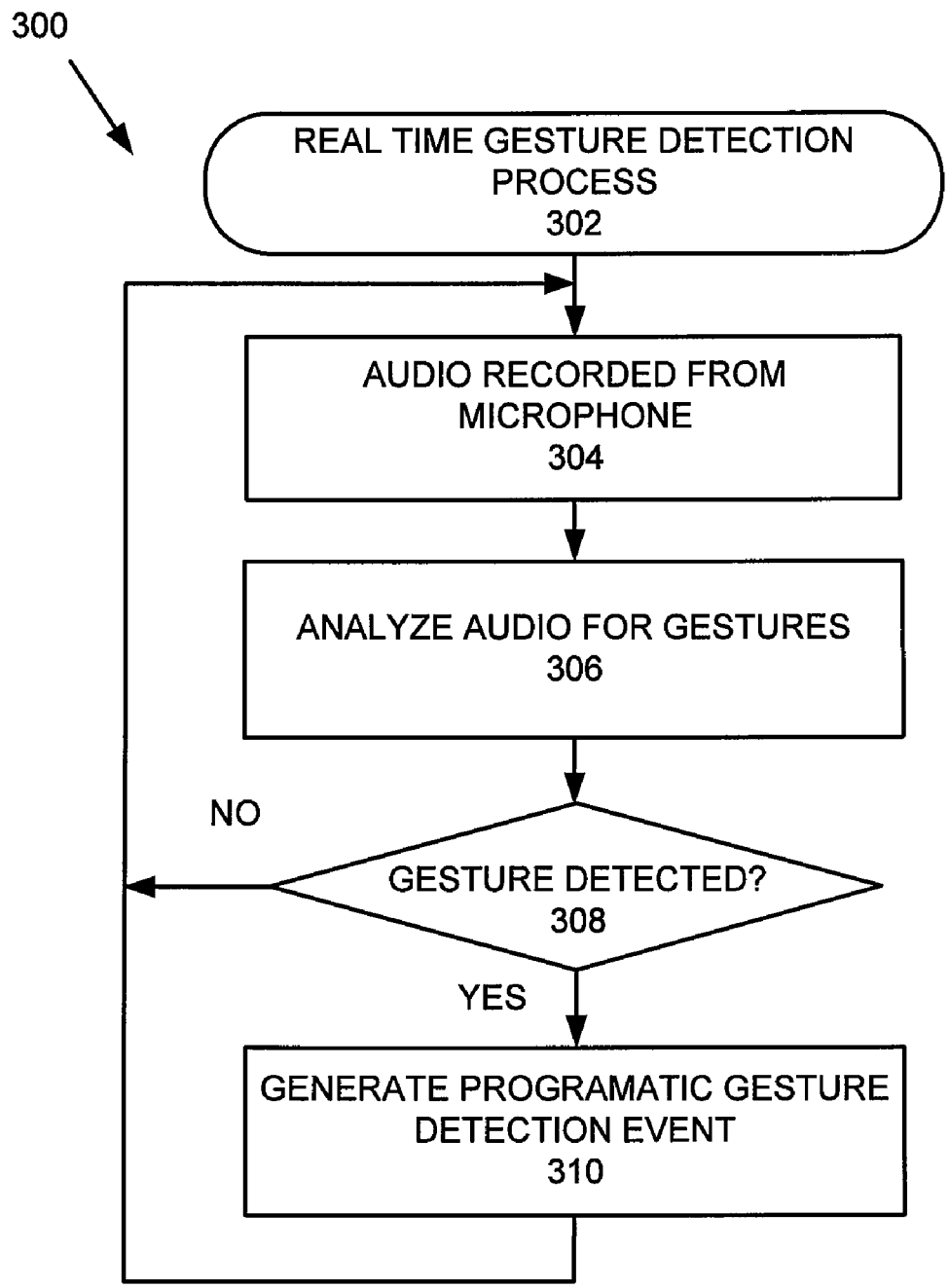
FIG. 3 is a block diagram of a real-time process for detecting a user gesture, according to one embodiment of the methods and methods disclosed herein.

FIG. 3 illustrates one example of a real-time process for detecting the occurrence of a user gesture with a embedded microphone, according to an embodiment of PMCD 100. Process 300 is entered at step 302, in one embodiment, by the user, or it may be invoked as a service by the operating method or executed by a separate application in additional embodiments. At step 304 the sampled output of the microphone is recorded and stored. The recording process samples short durations of output from the microphone, comprised of a stream of values that encode the audio sensed by the microphone. In some embodiments, the stream values are stored in a file constituting a "frame" of samples. In one embodiment, the samples may be stored in two's complement in pulse coded modulation format (PCM) and formatted as a wave (.WAV) file.

At step 306 the recorded audio is analyzed for gestures using various Music Information Retrieval techniques. MIR techniques comprise many known techniques and functions, which may be implemented by software libraries. These techniques, which will be discussed in more detail below, measure certain characteristics of the signal's energy. In one embodiment, the measured characteristic values are locally compared with local gesture detection threshold values to identify the occurrence of a particular gesture.

If the measurements of the characteristics for a particular signal exceed thresholds for gesture detection at step 308, then a real-time programmatic gesture detection event is generated at step 310. Some embodiments of detection process 300 also ensure that an ambient background noise running average is continuously updated. If a real-time gesture event is not detected at step 308, process 300 returns to step 304. Process 300 then continues in the same manner until the application is terminated.

Process 300, in one embodiment, may be multithreaded such that the recording at step 304 occurs contemporaneously with the ensuing steps 306, 308, and 310. Partitioning the process 300 by scheduling a thread of execution for executing recording step 304, and a separate thread of execution for executing the analysis, decision, and notification steps 306, 308 and 310, permits an increase in performance and resolution of signals. The closer together that samples are recorded by step 304 records, the shorter the duration of gaps between recordings. During such gap intervals, user gestures potentially may be missed.

In the preferred embodiment, PMCD 100 operates in a standalone mode to sample, store, locally process data from the microphone, and detect user gestures. In another embodiment, PMCD 100 communicates audio recorded from the microphone to an external remote host for real-time event detection and classification. A benefit of the latter mode of operation is that a sufficiently powerful external remote host offers greater computing power and thus accuracy for event detection, gesture identification, gesture classification, and dynamic updating of detection threshold parameters while simultaneously relieving the PMCD of the associated gesture detection processing overhead.

As mentioned above, Music Information Retrieval (MIR) techniques are used by PMCD 100 to detect and classify user gestures, by extracting characteristic features from the recorded audio signals. Various embodiments may extract one or more of these features. One such feature is the signal's half-rectified average energy content. Narrow ranges of average energies tend to correlate with particular types of gestures, so average energy is a useful characteristic for identifying a gesture. Average energy is normally calculated by summing over the magnitude of each sample of the fully rectified series. In the present disclosure, however, it is recognized that the average energy may be sufficiently calculated by summing over the magnitudes of the half-rectified series because only the relative energy levels are useful in determining if a gesture occurred. In practice, half-rectification may be accomplished by ignoring samples whose magnitude is less than zero.

Another feature extracted from the signal is the spectral centroid of the signal. The spectral centroid characterizes the audio content of the signal and may be calculated as the mean of the frequencies present in the signal weighted by their respective magnitudes, or, equivalently, the signal's average frequency multiplied by its amplitude. The spectral centroid for each audio frame can be calculated by applying a Discrete Fourier Transform (DFT) to each frame and multiplying each resultant frequency component by its respective magnitude, then summing over all of the products of the multiplications. Through training, each user gesture becomes associated with a certain narrow range of values of the spectral centroid so that a combination of spectral centroid and average energy measurement for a particular frame is later sufficient to distinguish one particular type of user gesture from another.

Yet another feature extracted from the signal is a count of the number of zero crossings the signal makes in a particular audio frame. A zero crossing is identified when the polarity of an individual sample's magnitude changes to the polarity opposite that of the previous sample. Thus, the number of zero crossings contained in a frame of recorded audio is equivalent to the number of times the signal crosses from a positive magnitude to a negative magnitude and vice versa within the given frame.

Figure 4A:
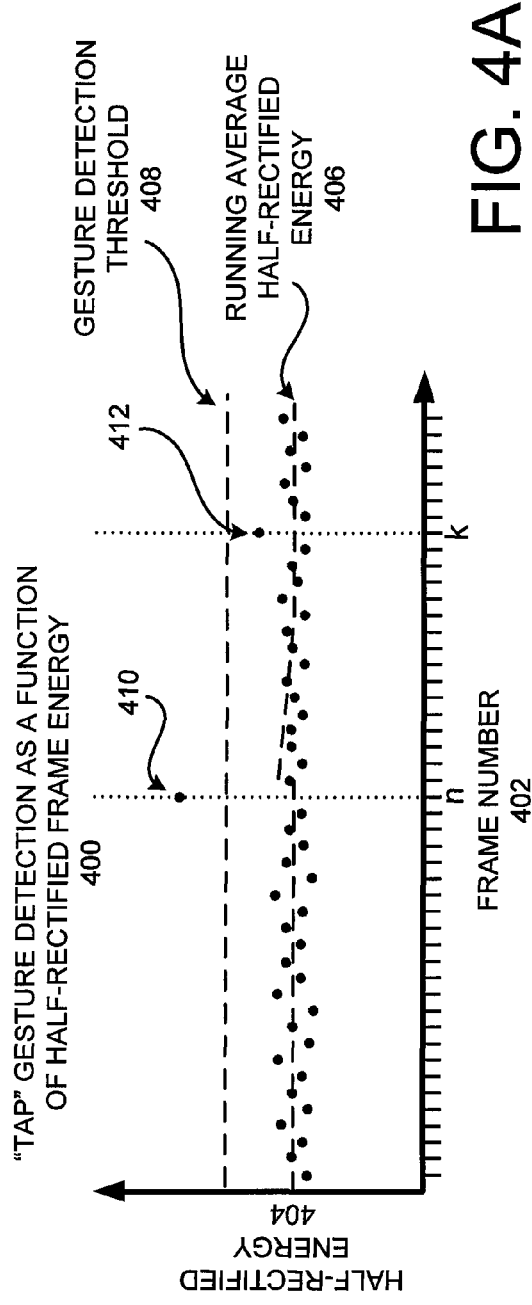
FIG. 4A is an illustration of characteristics of a "Tap" type gesture, according to one embodiment of the methods and methods disclosed herein.
Figure 4B:
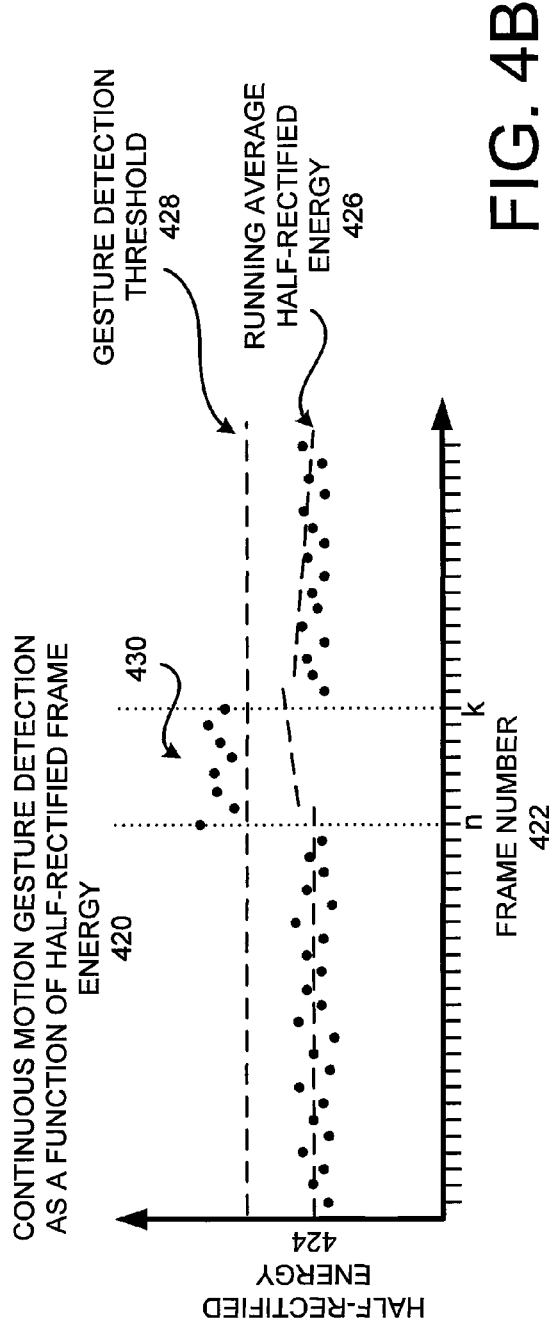
FIG. 4B is an illustration of characteristics of a "Sweep" type gesture, according to one embodiment of the methods and methods disclosed herein.

FIGS. 4A and 4B illustrate parameters and detection thresholds for detecting the occurrences of "tap" and "sweep" types of user gestures, respectively, with a PMCD. To determine an occurrence of these gestures, the recorded signal is first half-rectified and a running average of energy values 406 calculated over a plurality of previous samples is maintained. This running average is characteristic of the average signal energy picked up by the microphone which includes ambient background noise detected by the microphone in addition to any user gesture which may occur. In one embodiment, the number of previous samples stored, or the size of the sample "window," is configurable by the user; in another embodiment, this parameter is fixed. In some embodiments, the running average is used to establish a gesture detection threshold. Other embodiments establish the detection threshold through one or more various transformations of the running average energy value, including multiplying the running average by a constant, by adding a constant, by a combination of multiplying and adding, by establishing a fixed detection floor at a statistically stable point above the average, as shown in FIGS. 4A and 4B, or by applying some other transformative factor. This detection threshold may also be modified or calibrated as required by varying acoustic sensitivities or configurations inherent in different types and models of PMCDs.

FIG. 4A illustrates characteristics of a single "tap," 410, in which the average energy of frame number n, 410, exceeds gesture detection threshold 408 which is set above the running average half-rectified energy 406. A frame whose half-rectified total energy exceeds gesture detection threshold energy 408 satisfies the criteria for detection and programmatic event corresponding to the user gesture detection event (e.g., the "tap") is generated. If the half-rectified total energy value of a frame does not equal or exceed the gesture detection threshold 408, such as frame number k 412, then a programmatic event will not be generated.

FIG. 4B illustrates characteristics of a "sweep" or a continuous type of gesture wherein the average energy of several sequential frames 430, beginning with frame number n and ending with frame number k, continually exceed gesture detection threshold 428 which is set above the running average half-rectified energy 428. The occurrence of several sequential frames with energies exceeding the average may occur when the user of the PMCD makes a sweeping gesture with the PMCD, rotates it, or otherwise exposes the PMCD to background noise of a level sufficiently in excess of the previous average level of ambient background noise.

Gestures proximate and distal to the microphone may be detected. In one embodiment, additional threshold values may be maintained in the stand-alone configuration which allow PMCD 100 to discriminate between more than one impact location relative to the location of microphone 216. In a second embodiment, a classifier may be trained to recognize impact proximity relative to the microphone.

Figure 5:
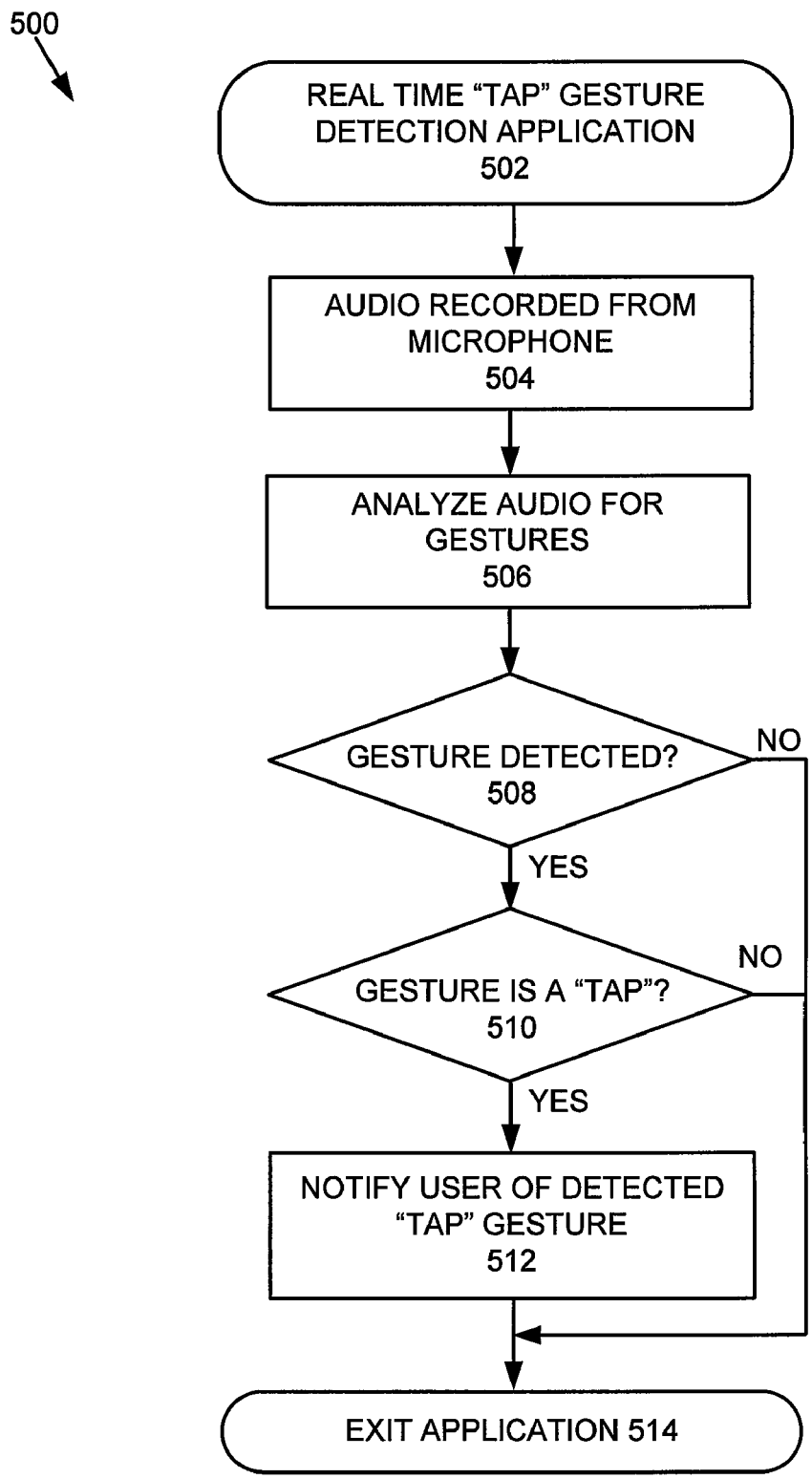
FIG. 5 is a flow chart for real-time tap detection, according to one embodiment of the methods and methods disclosed herein.

FIG. 5 illustrates a real-time process for detecting a user gesture, which may be a "tap", a "sweep", or a "rotation." Process 500 begins at step 502 when the application is invoked. At step 504, the process begins recording audio from the microphone. While the process is recording at step 504, the user may strike PMCD 100. After recording a sufficient number of audio frames, process 500 then invokes MIR techniques at step 506 to analyze the audio for gestures. If a user gesture is detected at step 508, process 500 continues to step 510 to determine the gesture type. If a gesture is not detected, process 500 exits at step 514. At step 510, process 500 determines the gesture type from the characteristic data obtained at step 506. If a "tap" is detected, process 500 notifies the user at step 512 that a tap gesture was detected. If any gesture other than a tap is detected, process 500 falls through step 512 and exits at step 514.

In other embodiments, process 500 may be multithreaded to continually record samples concomitant with the analysis and detection of a user gesture. A benefit of multithreading the application is to reduce the time delay between recording frames so that user gestures do not potentially fall into gaps between recordings of audio from the microphone. Multithreading further allows the application to continually record, detect, and identify user gestures until the application has either identified the specifically requested gesture or the user terminates the application.

In some embodiments of user gesture detection process 500 the detection processing occurs on external remote host. In this embodiment, process 500 is modified to provide record and transmit data to the remote host. The analysis step 506, gesture detection step 508, and gesture identification step 510 will occur on the remote host.

Figure 6:
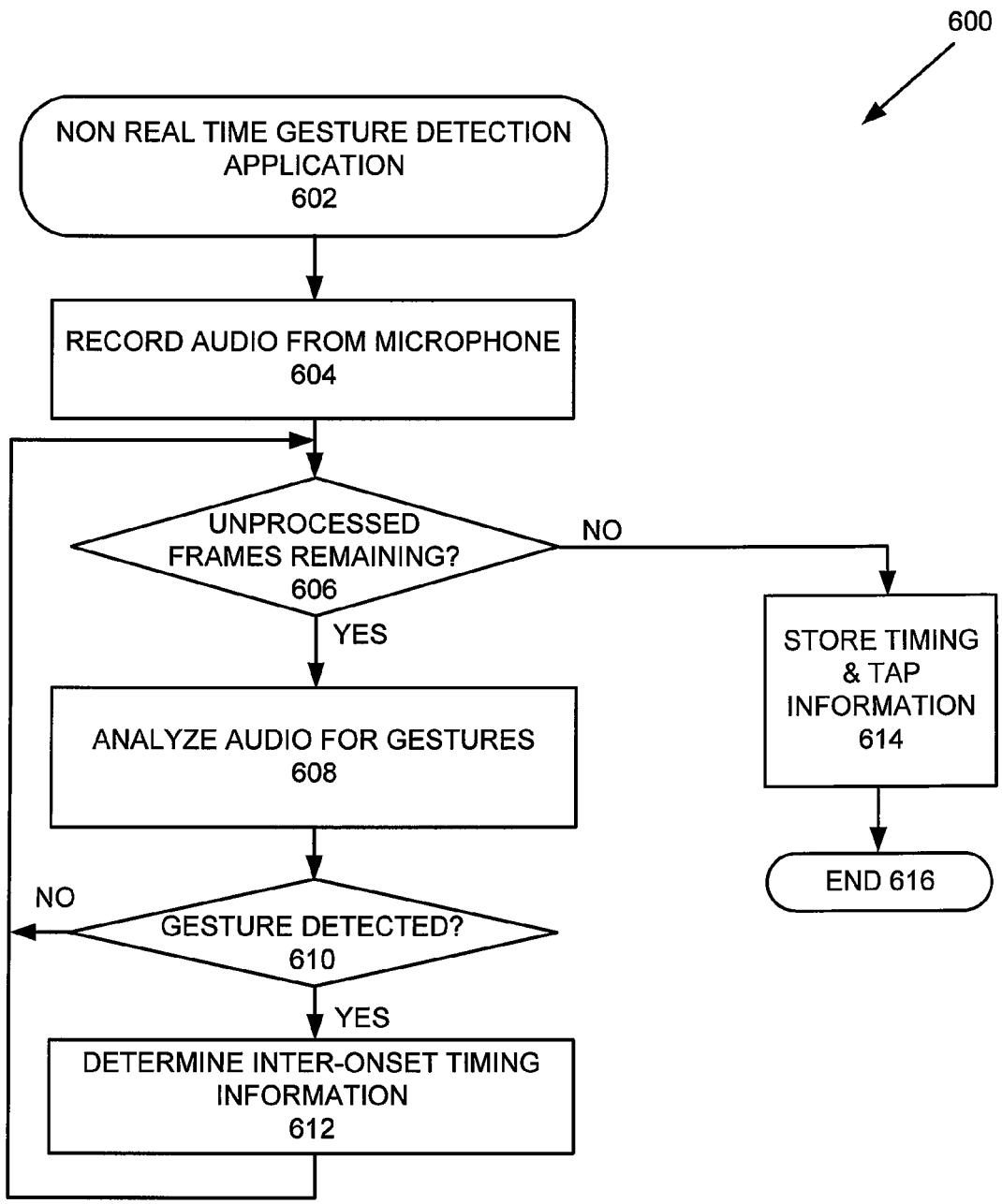
FIG. 6 is a flow chart for non-real-time gesture detection, according to one embodiment of the methods and methods disclosed herein.

FIG. 5 described a real-time process for detecting gestures that occurs contemporaneously with the recording of audio. FIG. 6 illustrates a non real-time process for detecting, identifying, and storing a gesture pattern from previously recorded audio. The non real-time gesture detection application is invoked at step 602 and process 600 begins executing on PMCD 100. At step 604, audio is recorded from the microphone for a particular number of milliseconds. In some embodiments, this number is fixed while in others this number is user-configurable. The recording process samples short durations of output from the microphone, comprised of a stream of values that encode the audio sensed by the microphone. In some embodiments, the stream values are stored in a file constituting a "frame" of samples. In one embodiment, the samples may be stored in two's complement in pulse coded modulation format (PCM) and formatted as a wave (.WAV) file.

When step 604 has recorded the specified number of milliseconds of audio, process 600 determines if any unprocessed frames remain at step 606. If so, an unprocessed frame is selected and analyzed at step 608. If an object is not available at step 606, process 600 continues to step 614.

If an unprocessed frame is available at step 606, process 600 then selects the frame and invokes previously described MIR techniques to analyze and characterize the frame at step 608. At step 610, process 600 determines if a user gesture event occurred.

If a gesture detection event is detected at 610, then gesture inter-onset timing information is calculated at 612 as the elapsed period between two successive gesture detection events; otherwise process 600 returns to step 606 to select the next unprocessed audio frame. In one embodiment, process 600 maintains an array comprised of each frame's total half-rectified energy and its corresponding time of occurrence so that the timing interval between the occurrences of sequential gesture events can be calculated.

Process 600 then continues in the same manner until no more unprocessed audio frames exist at which time it exits the loop at step 606, continuing with step 614. At step 614, process 600 notifies the user of the tap pattern and stores the accumulated inter-onset timing information.

As discussed above, PMCD 100 detects user gestures, which are motions a user makes with and upon the PMCD thereby creating characteristic sounds which can be sensed by the microphone. One such type of user gesture includes "taps" of a finger or other object upon the body of PMCD 100 proximate to the microphone, similar taps upon the body of PMCD 100 distal to the microphone, taps upon the surfaces of PMCD 100. Some embodiments of PCMD 100 distinguish between taps by the type of material contacted or impacted by PMCD 100.

Figure 7:
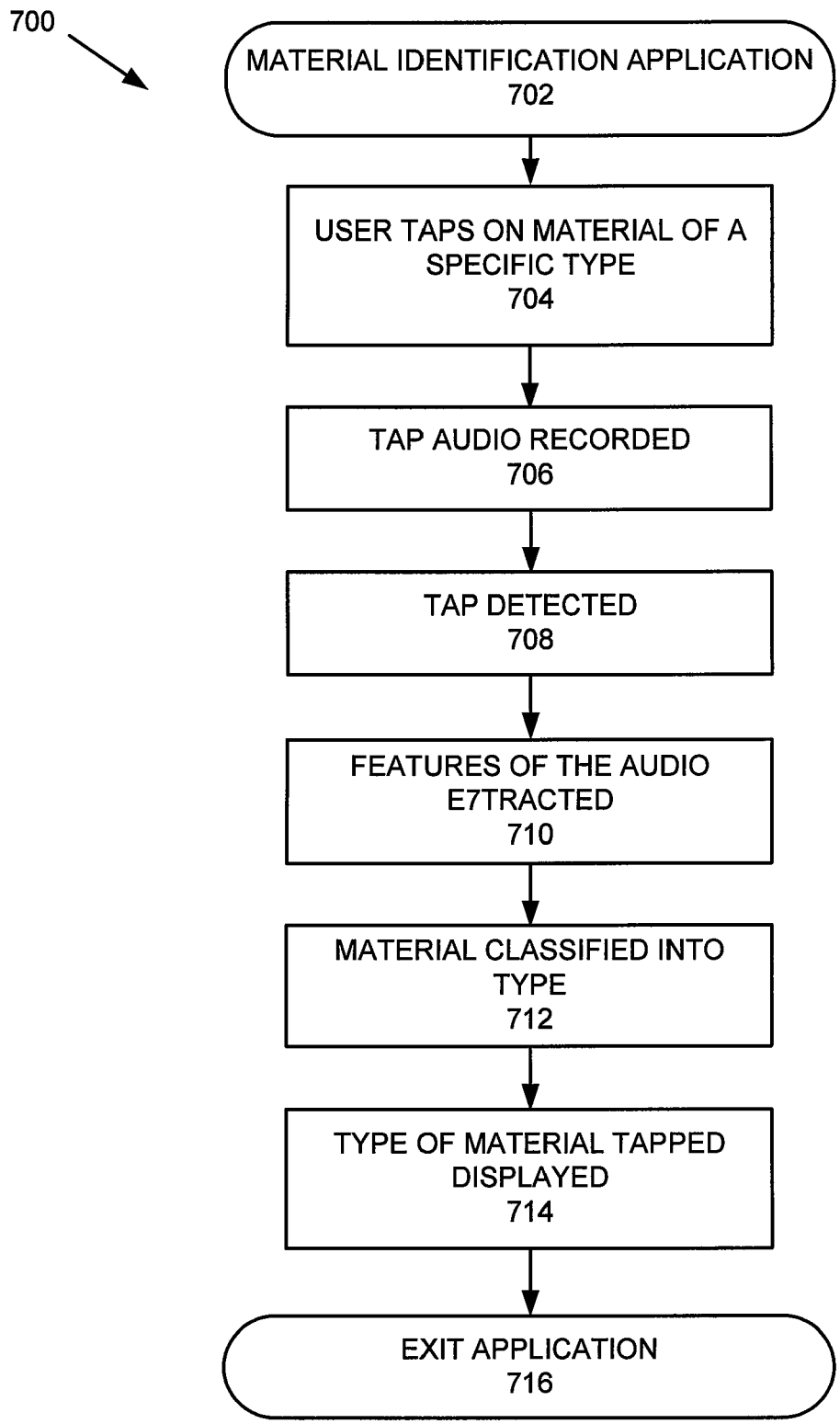
FIG. 7 is a flow chart for detecting a type of material struck by the PMCD or with which the PMCD is struck, according to one embodiment of the methods and methods disclosed herein.

FIG. 7 illustrates a block diagram of a process 700 for classifying different types of material which may be contacted or impacted by PMCD 100. Process 700 is invoked at step 702. At step 704 the user taps PMCD 100 on a surface which may be of soft, hard or of metal composition which is recorded in step 706. At step 706 the tap is detected. Once audio has been recorded from the microphone and the tap detected, process 700 invokes MIR techniques in step 710 to extract features of the recorded audio. In particular, step 710 extracts the number of zero-crossings present in the recorded frame.

At step 712 the material is classified by comparing the number of zero crossings, obtained in step 701, to threshold values for different materials. Different materials are associated with the presence of fewer or greater numbers of zero-crossings in a given frame of audio. Metal samples tend to have greater number of zero-crossings while softer materials, such as wood, have fewer, while even softer materials, such as a user's hand have the relative fewest.

Once the determination of material has been made in step 712, a notification of the type of material detected us displayed to the user in step 714. Process 700 then exits at step 716.

In another embodiment, process 700 invokes classifier 1200, which will be discussed below, to which the extracted characteristic information including zero-crossings for classification is provided. Additional embodiments maintain ranges for classification of materials.

As discussed above in connection with FIG. 2, some embodiments of PMCD 100 transmit the audio recorded from the microphone as sound signals through cellular radio network. The signals are delivered to a remote host using traditional cellular voice communications techniques. The signals may be further processed digitally following reception by the remote host, in order to transform, analyze, or reconstruct the original recorded audio.

Figure 8:
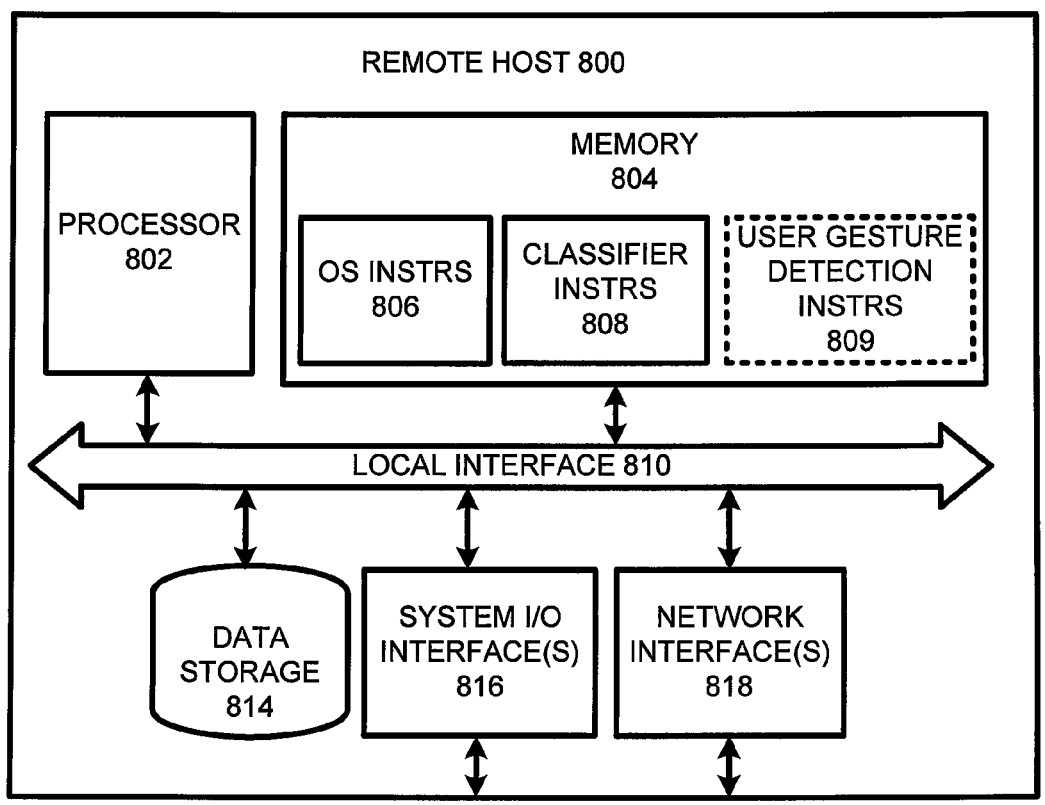
FIG. 8 is a block diagram of a remote host, according to one embodiment of the methods and methods disclosed herein.

FIG. 8 illustrates a block diagram of a remote host with which PMCD 100 may communicate, according to some embodiments disclosed herein. Remote Host 800 includes processor 802, memory submethod 804, local interface bus 810, storage 814, method input/output interface block 816, and network interface(s) 818. Memory submethod 804 includes instruction that are executable on process 802. Memory submethod 804 includes instructions for operating method 806 and classifier 808. Some embodiments further include instructions for user gesture detection 809. Network interface 820 may be an interface for a wired network (e.g., IEEE 802.3 Ethernet, HomePNA, etc.) or a wireless network (Bluetooth™, IEEE 802.11 Wi-Fi™, Zigbee™, etc.)

Figure 9:
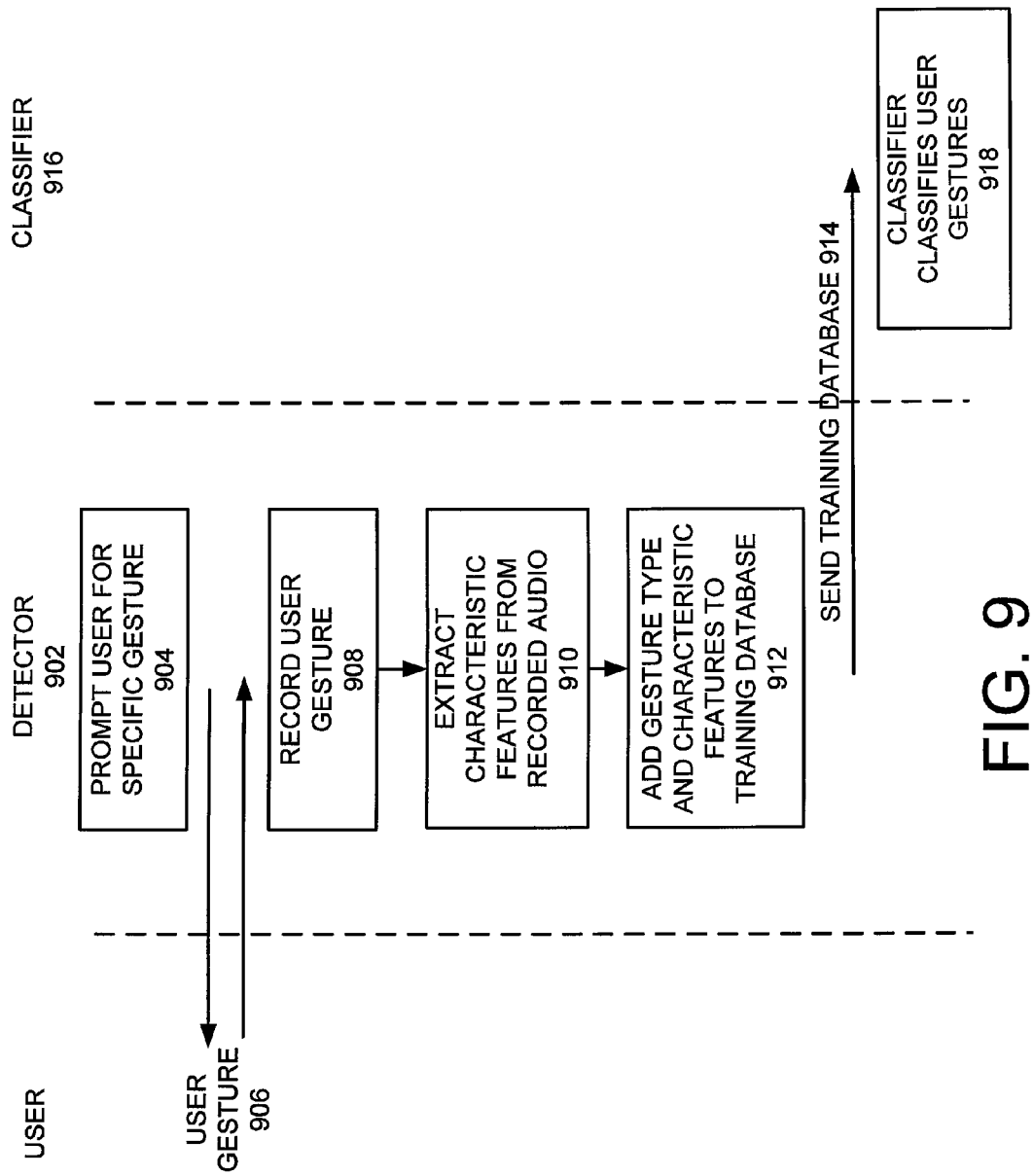
FIG. 9 is a flow chart of a process for training a classifier to classify user gesture types, in one embodiment of the methods and methods disclosed herein.

FIG. 9 illustrates a message sequence diagram for training a classifier to recognize specific user gestures. The training sequence begins with a detector 902 prompting the user to execute a specific gesture (block 904). The user performs the requested gesture (event 906) and audio of the requested gesture is recorded (block 908) by detector 902. Characteristic feature information is then extracted from the recorded audio using MIR techniques (block 910). This extracted feature information is formatted (block 908) as a feature matrix record with corresponding gesture type. Once fully composed, the record is added to training set database. (The training set database will be discussed shortly in connection with FIG. 11). As successive feature matrix entries are formed, they are added to the training set database (block 912). The training set database is sent (event 914) to classifier 916, upon recording a sufficient number of sample gestures which cover the gesture space of classifier 916. Classifier 916 is trained (block 918) to recognize the each type of gestures contained in the training set database. The classifier may employ various algorithms known to a person of ordinary skill in the art (e.g., K-Nearest Neighbor, Support Vector Machines (SVM), and Naïve Bayesian). In some embodiments, classifier 916 is executed on remote host 800 rather than on PMCD 100.

Figure 10:
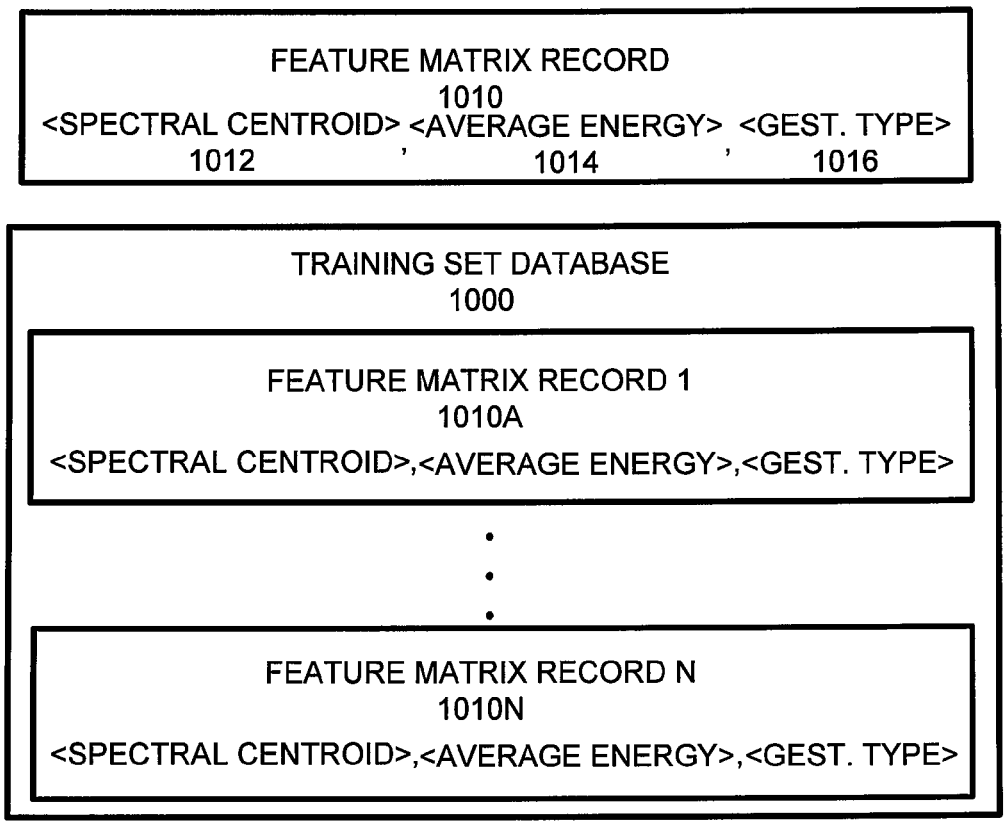
FIG. 10 is a block diagram of a feature matrix entry and a training set database, according to one embodiment of the methods and methods disclosed herein.

FIG. 10 illustrates the format of a feature matrix record and a training set database. Training set database 1000 comprises a plurality of entries for different types of gestures which the classifier is to be trained to recognize. Training set database 1110 is comprised of a plurality of feature matrix records 1100, where each type of user gesture may have several unique feature matrix records 1010. Each feature matrix record 1010 comprises a spectral centroid field 1012, an average energy field 1014, and a gesture type field 1016. When employed in classification, the gesture type field is left empty. When employed in training, the gesture field indicates the particular gesture being learned.

Figure 11:
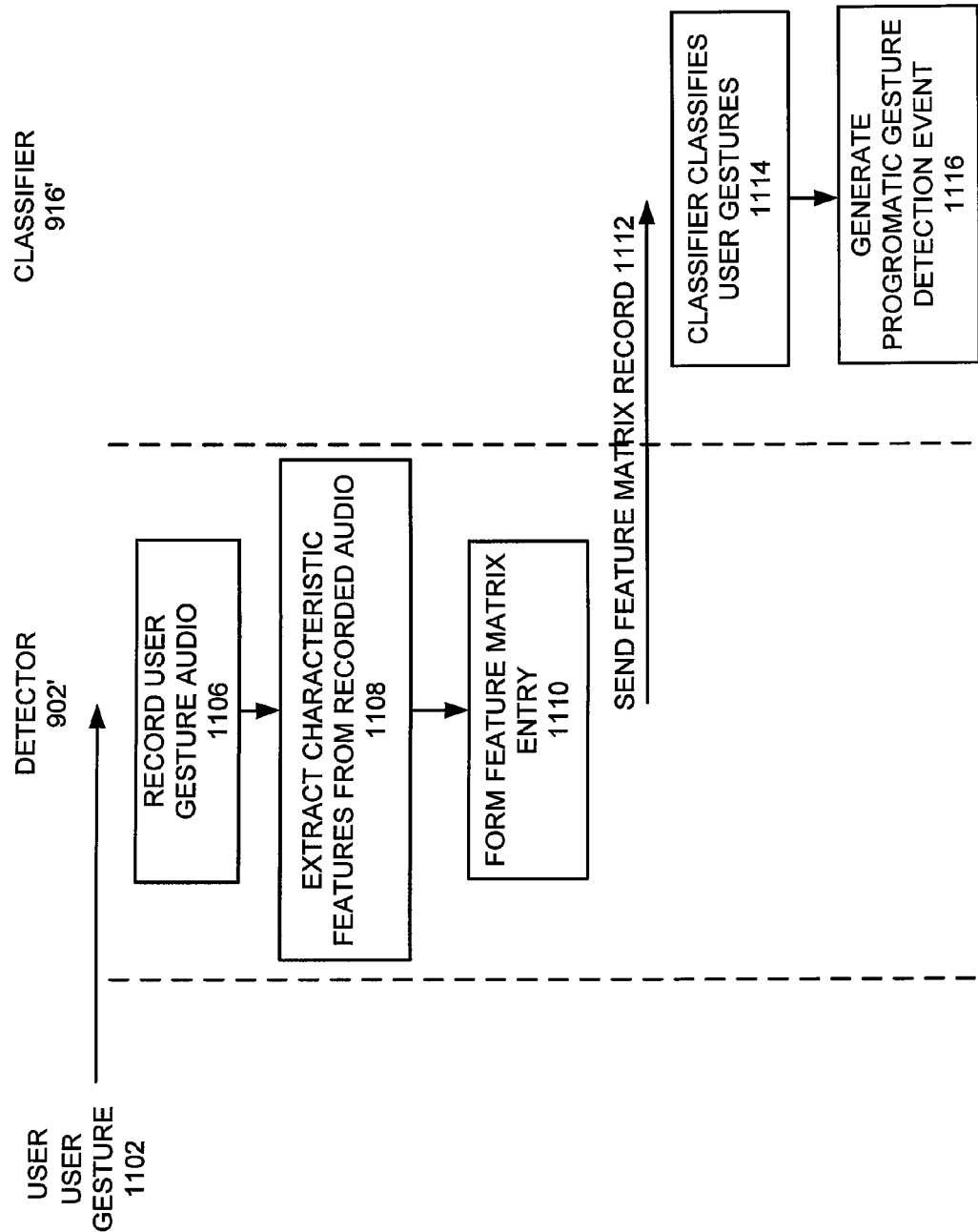
FIG. 11 is a message diagram of a process for detecting and classifying the type of user gesture detected by the PMCD of FIG. 2, in one embodiment of the methods and methods disclosed herein.

Once classifier 916 is trained to recognize user gestures, the trained method can be used to classify a user gesture in real time. FIG. 11 illustrates a message sequence diagram for classifying a user gesture in real time. This sequence involves a detector 902' and a classifier 904'. The sequence begins with the user performing a gesture (event 1102) with PMCD 100. The detector 1104 records the audio resulting from the gesture, detects the gesture, and store associated data (block 1104). Detector 1104 extracts characteristic features of the recorded audio using MIR techniques (block 1108). Extracted features may include the signal's average energy and its spectral centroid. Detector uses calculated values for extracted features to form a feature matrix record (block 1110). The feature matrix record is then sent (event 1112) to classifier 1200 for classification of the unspecified tap type. Classifier 1200 classifies (block 1114) the detected user gesture and generates (block 1116) a programmatic gesture detection event. In one embodiment, the classification algorithm is user-selectable.

FIG. 12 illustrates an example of a confusion matrix and classification success percentage when using "K-nearest neighbor" on two parameters—average energy and spectral centroid for two different types of user gestures, in this case "taps," (one type being proximate to the microphone and the other type distal to the microphone). The figure indicates that 200 user gestures had been made with the PMCD, of which the classifier overall correctly identified 85.5% and incorrectly identified 14.5% and further illustrates the numbers of gestures detected correctly near the microphone and taps far from the microphone.

Figure 13:
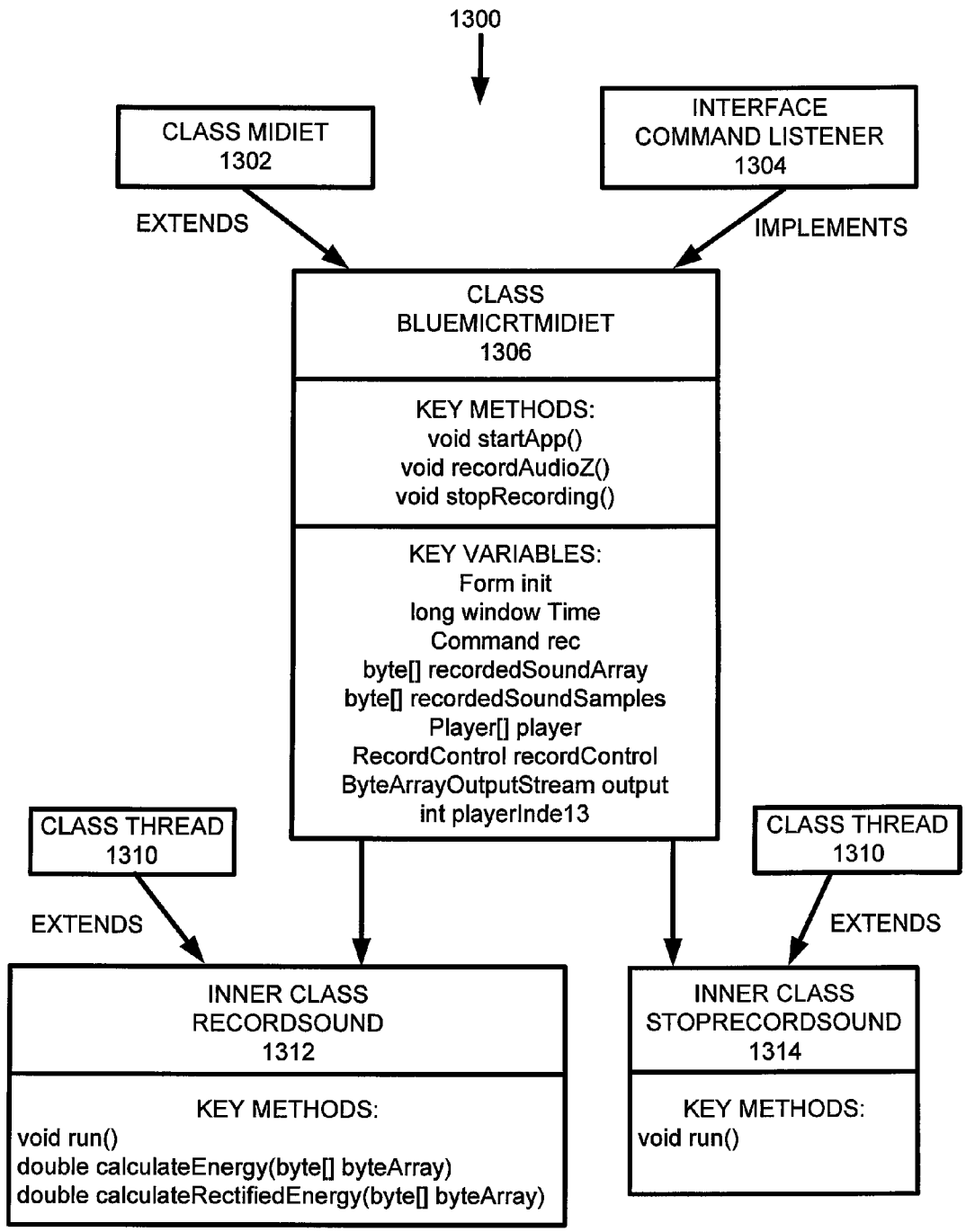
FIG. 13 is a block diagram of the software classes, subclasses, class methods and attributes for implementing the process of identifying different types of user gestures in real time, shown in FIG. 9, in one embodiment of the methods and methods disclosed herein.

FIG. 13 is a block diagram of the software classes used to implement process 300 for real-time gesture detection, according to one embodiment of the methods and methods disclosed herein. Class BlueMicRTMIDlet1 1506 extends class MiDlet 1502 and implements an instance of class interface command listener 1504. Class BlueMicRTMIDlet1 1506 contains methods and attributes for recording audio from the microphone and storing it to a sample array, and operating upon the samples. Classes RecordSound 1512 and StopRecordSound 1514, are subclassed from class BlueMicRTMIDlet1 1506 and are both extended by class Thread 1510. Class RecordSound 1512 contains member functions for calculating energy and calculating rectified energy of a recorded sound frame. The processes for recording audio objects and analysis of objects once recorded may be multi-threaded and significant performance improvements may be obtained.

Figure 14:
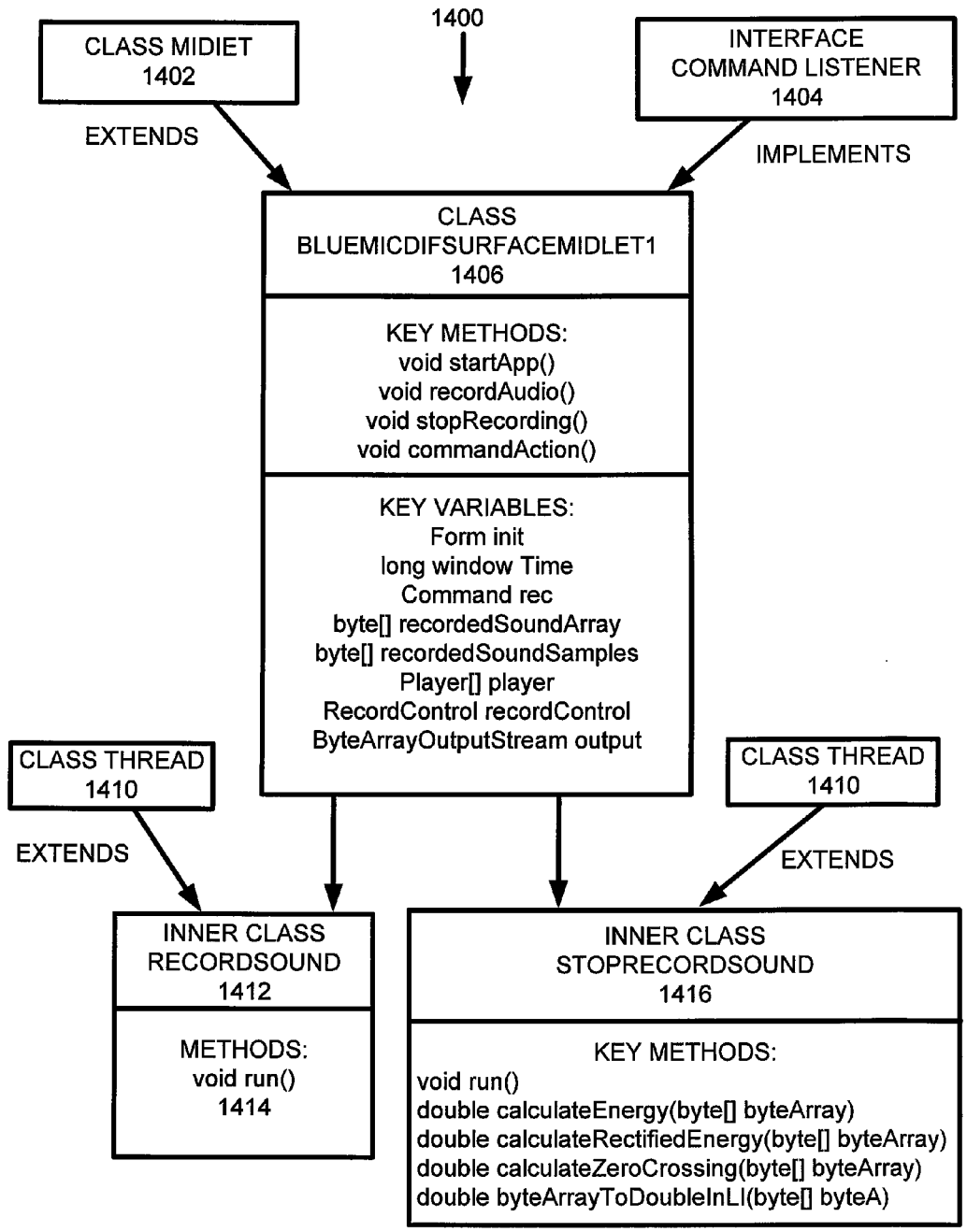
FIG. 14 is a block diagram of the software classes, subclasses, class methods and attributes for implementing the process of identifying different types of materials struck by the PMCD or with which the PMCD is struck, shown in FIG. 14, in one embodiment of the methods and methods disclosed herein.

FIG. 14 is a block diagram of the software classes used to implement process 700 for identifying different material types. Class BlueMicDifSurfaceMIDlet1 1606 extends class MiDlet 1502 and implements an instance of class interface command listener 1504. Class BlueMicDifSurfaceMIDlet1 1606 contains methods and attributes for recording audio from the microphone and storing the audio data to a sample array and operating upon the samples. Classes RecordSound 1612 and StopRecordSound 1616 are subclassed from class BlueMicDifSurfaceMIDlet1 1606 and are both extended by class Thread 1510. Class StopRecordSound 1616 contains member functions for calculating energy, calculating rectified energy, calculating zero crossings, and converting a byte array into an array of doubles. The processes for recording audio objects and analysis of objects once recorded may be multithreaded and significant performance improvements may be obtained.

Embodiments of the processes 300, 500, 600, 700, and of components 902, 916, 1300, and 1400 can be implemented in hardware, software, firmware, or a combination thereof. In one embodiment, these methods can each be implemented in hardware, implemented with any or a combination of the following technologies, which are all well known in the art: a discrete logic circuit(s) having logic gates for implementing logic functions upon signals, a programmable gate array(s) (PGA), a field programmable gate array (FPGA), an applications specific integrated circuit (ASIC) having appropriate combination logic gates, a method on chip (SoC), a method in package (SiP), etc.

If one or more of the functionalities of the methods disclosed herein is implemented as software, as in one embodiment, such functionalities of the method can be software or firmware that is stored in a memory and that is executed by a suitable processor. The method software, which comprises an ordered listing of executable instructions for implementing logical functions, can be embodied in any computer-readable medium for use by or in connection with a processor or processor-containing method. In the context of this document, a "computer-readable medium" can be any means that can contain or store the program for use by or in connection with the processor method, apparatus, or device. The computer readable medium can be, for example but not limited to, an electronic, magnetic, optical, electromagnetic, infrared, or semiconductor medium. More specific examples (a non-exhaustive list) of the computer-readable medium would include the following: a magnetic computer disk or diskette, a random access memory (RAM), a read-only memory (ROM), an erasable programmable read-only memory (EPROM or Flash memory), an optical compact disc read-only memory (CDROM).

It should be emphasized that the above-described embodiments are merely possible examples of implementations, merely set forth for a clear understanding of the disclosed principles. Many variations and modifications may be made to the above-described embodiment(s) without departing substantially from the disclosed spirit and principles. All such modifications and variations are intended to be included herein within the scope of this disclosure and protected by the following claims.

What is claimed is:

1. A system for detecting user gestures with a personal mobile communication device, the system comprising:
a microphone;
memory for storing executable instructions; and
a processor configured by the executable instructions to:
sense audio using the microphone;
record the audio sensed by the microphone;
process the recorded audio;
detect a user gesture from the processed audio;
responsive to the detection of the user gesture, generate a programmatic event;
determine a gesture type by:
evaluating energy content of the recorded signal;
evaluating a spectral centroid of the recorded signal;
classifying the recorded signal; and
identifying the classified recorded signal as one of a plurality of user gesture types; and
detect user gestures from the audio sensed by the microphone by determining whether the total energy in the frame equals or exceeds the current threshold value for gesture detection.

2. A system for detecting user gestures with a personal mobile communication device, the system comprising:
a microphone;
memory for storing executable instructions; and
a processor configured by the executable instructions to:
sense audio using the microphone;
record the audio sensed by the microphone;
process the recorded audio;
detect a user gesture from the processed audio;
responsive to the detection of the user gesture, generate a programmatic event;
detect user gestures from audio sensed by the microphone; and
determine a gesture type by:
evaluating energy content of the recorded signal;
evaluating a spectral centroid of the recorded signal;
classifying the recorded signal; and
identifying the classified recorded signal as one of a plurality of user gesture types,
wherein the processor is further configured by the executable instructions to evaluate the energy content by:
calculating a total energy content of half-rectified samples of the frame;
updating a current value of the threshold for gesture detection by calculating a moving average of total energy content, wherein the moving average is calculated as the average of the total energy of the frame and total energies of a plurality of previous frames; and
replacing the current threshold value for gesture detection with the calculated moving average of total energy value.

* * * * *